(12) United States Patent
Manning et al.

(10) Patent No.: US 10,378,444 B2
(45) Date of Patent: Aug. 13, 2019

(54) ENGINE COMPONENT FOR A GAS TURBINE ENGINE

(71) Applicant: General Electric Company, Schenectady, NY (US)

(72) Inventors: Robert Francis Manning, Newburyport, MA (US); Ronald Scott Bunker, West Chester, OH (US); Robert Frederick Bergholz, Loveland, OH (US); Robert David Briggs, West Chester, OH (US)

(73) Assignee: General Electric Company, Schenectady, NY (US)

( * ) Notice: Subject to any disclaimer, the term of this patent is extended or adjusted under 35 U.S.C. 154(b) by 637 days.

(21) Appl. No.: 14/829,678

(22) Filed: Aug. 19, 2015

(65) Prior Publication Data

US 2017/0051674 A1 Feb. 23, 2017

(51) Int. Cl.
*F02C 3/00* (2006.01)
*F02C 7/18* (2006.01)
*F01D 5/18* (2006.01)

(52) U.S. Cl.
CPC ............ *F02C 7/18* (2013.01); *F01D 5/186* (2013.01); *F05D 2250/294* (2013.01); *F05D 2260/202* (2013.01); *F23R 2900/03042* (2013.01); *Y02T 50/672* (2013.01); *Y02T 50/676* (2013.01)

(58) Field of Classification Search
CPC ............ F23R 2900/03042; F23R 3/06; F05D 2260/202; F05B 2260/202
See application file for complete search history.

(56) References Cited

U.S. PATENT DOCUMENTS

| 4,773,593 A | * | 9/1988 | Auxier | F01D 5/184 239/127.3 |
| 5,419,681 A | | 5/1995 | Lee | |
| 5,503,529 A | | 4/1996 | Anselmi et al. | |
| 5,528,904 A | * | 6/1996 | Jones | F01D 5/288 60/753 |
| 6,234,755 B1 | | 5/2001 | Bunker et al. | |

(Continued)

FOREIGN PATENT DOCUMENTS

| CN | 101042056 A | 9/2007 |
| CN | 104747242 A | 7/2015 |

(Continued)

OTHER PUBLICATIONS

European Search Report and Opinion issued in connection with corresponding EP Application No. 16184517.7 dated Dec. 26, 2016.

(Continued)

*Primary Examiner* — Gerald L Sung
(74) *Attorney, Agent, or Firm* — McGarry Bair PC (57) ABSTRACT

An engine component for a gas turbine engine includes a film-cooled recess comprising a contoured portion defining a step. A hot surface facing hot combustion gas and a cooling surface facing a cooling fluid flow are fluidly coupled by a passage through the engine component. The passage further comprises an inlet in the cooling surface and an outlet in the step. The inlet, passage and outlet are oriented such that the cooling fluid flowing through the passage and exiting the outlet diffuses within the contoured portion prevents premature mixing out with the hot fluid flow.

14 Claims, 10 Drawing Sheets

(56) References Cited

U.S. PATENT DOCUMENTS

| | | | |
|---|---|---|---|
| 6,383,602 B1 | 5/2002 | Fric et al. | |
| 8,572,981 B2 | 11/2013 | Bunker | |
| 2008/0010992 A1* | 1/2008 | Patterson | F23R 3/06 |
| | | | 60/772 |
| 2008/0057271 A1* | 3/2008 | Bunker | F01D 5/186 |
| | | | 428/137 |
| 2009/0246011 A1 | 10/2009 | Itzel | |
| 2011/0305582 A1 | 12/2011 | Lee et al. | |
| 2015/0059357 A1 | 3/2015 | Morgan et al. | |
| 2015/0121885 A1* | 5/2015 | Yokota | F23R 3/005 |
| | | | 60/754 |
| 2015/0300645 A1* | 10/2015 | Jopp | F23R 3/002 |
| | | | 60/753 |

FOREIGN PATENT DOCUMENTS

| | | |
|---|---|---|
| DE | 102009003634 A1 | 10/2009 |
| EP | 2369135 A2 | 9/2011 |
| EP | 2592228 A1 | 5/2013 |
| JP | 2010144578 A | 7/2010 |
| WO | 2015047516 A1 | 4/2015 |

OTHER PUBLICATIONS

Second Office Action and Supplementary Search issued in connection with corresponding CN Application No. 201610687497.8 dated Apr. 16, 2018.

* cited by examiner

ENGINE COMPONENT FOR A GAS TURBINE ENGINE

BACKGROUND OF THE INVENTION

Turbine engines, and particularly gas or combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for aircraft, including helicopters. In aircraft, gas turbine engines are used for propulsion of the aircraft. In terrestrial applications, turbine engines are often used for power generation.

Gas turbine engines for aircraft are designed to operate at high temperatures to maximize engine efficiency, so cooling of certain engine components, such as the high pressure turbine and the low pressure turbine, can be necessary. Typically, cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is a high temperature, it is cooler relative to the turbine air, and can be used to cool the turbine.

Cooling air used to cool the engine components is routed to the hot surfaces of the engine components through one or more film holes. Air exiting the film holes spreads across the hot surface of the engine component, cooling the engine component and creating a barrier between the hot air and the engine component surface. Typical film holes deliver cooling air along an engine component, which is subject to a high speed, turbulent hot air flow, where the cool air quickly mixes out with the hot air. As such, additional film holes can be necessary to maintain the cooling air barrier to properly cool the engine component, increasing cost, reducing structural integrity and component life, and reducing engine efficiency.

BRIEF DESCRIPTION OF THE INVENTION

In one aspect, an engine component for a gas turbine engine generating hot combustion gas. The engine component includes a wall separating the hot combustion gas from a cooling fluid flow and having a hot surface having a primary plane facing the hot combustion gas flow and a cooling surface facing the cooling fluid flow. A recess formed in the hot surface below the primary plane is at least partially defined by a step and a ramp extending downstream from the step and upwardly toward the primary plane. At least one film hole has an inlet provided in the cooling surface, an outlet provided on the step, and a passage connecting the inlet and the outlet.

In another aspect, an engine component for a gas turbine engine, the gas turbine engine generating a hot combustion gas flow comprises a wall separating the hot combustion gas flow from a cooling fluid flow and having a hot surface having a primary plane facing the hot combustion gas flow and a cooling surface facing the cooling fluid flow. A contoured portion formed in the hot surface below the primary plane and having a step defining a face and a ramp extending upwardly and downstream from the step toward the primary plane, and a bottom connecting the face and the ramp. Multiple film holes have an inlet provided on the cooling surface and an outlet provided below the primary plane on the contoured portion upstream of the ramp, with a passage connecting the inlet and the outlet, defining a centerline wherein a component of the centerline is parallel to the face.

In yet another aspect, a method of cooling an engine component for a gas turbine engine having a wall separating a hot combustion gas and a cooling fluid flow and having a hot surface having a primary plane facing the hot combustion gas flow and a cooling surface facing the cooling fluid flow, the method comprising, generating a cooling fluid flow into a recess located below the primary plane and the hot combustion gas flow.

DETAILED DESCRIPTION

The disclosure relates to a film-cooled engine component, particularly in a gas turbine engine. For purposes of illustration, the subject matter will be described with respect to an aircraft gas turbine engine. It will be understood, however, that the subject matter is not so limited and can have general applicability in non-aircraft applications, such as other mobile applications and non-mobile industrial, commercial, and residential applications.

As used herein, the terms "axial" or "axially" refer to a dimension along a longitudinal axis of an engine. The term "forward" or "upstream" used in conjunction with "axial" or "axially" refers to moving in a direction toward the engine inlet, or a component being relatively closer to the engine inlet as compared to another component. The term "aft" or "downstream" used in conjunction with "axial" or "axially" refers to a direction toward the rear or outlet of the engine relative to the engine centerline.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding, and do not create limitations, particularly as to the position, orientation, or use. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

Figure 1:
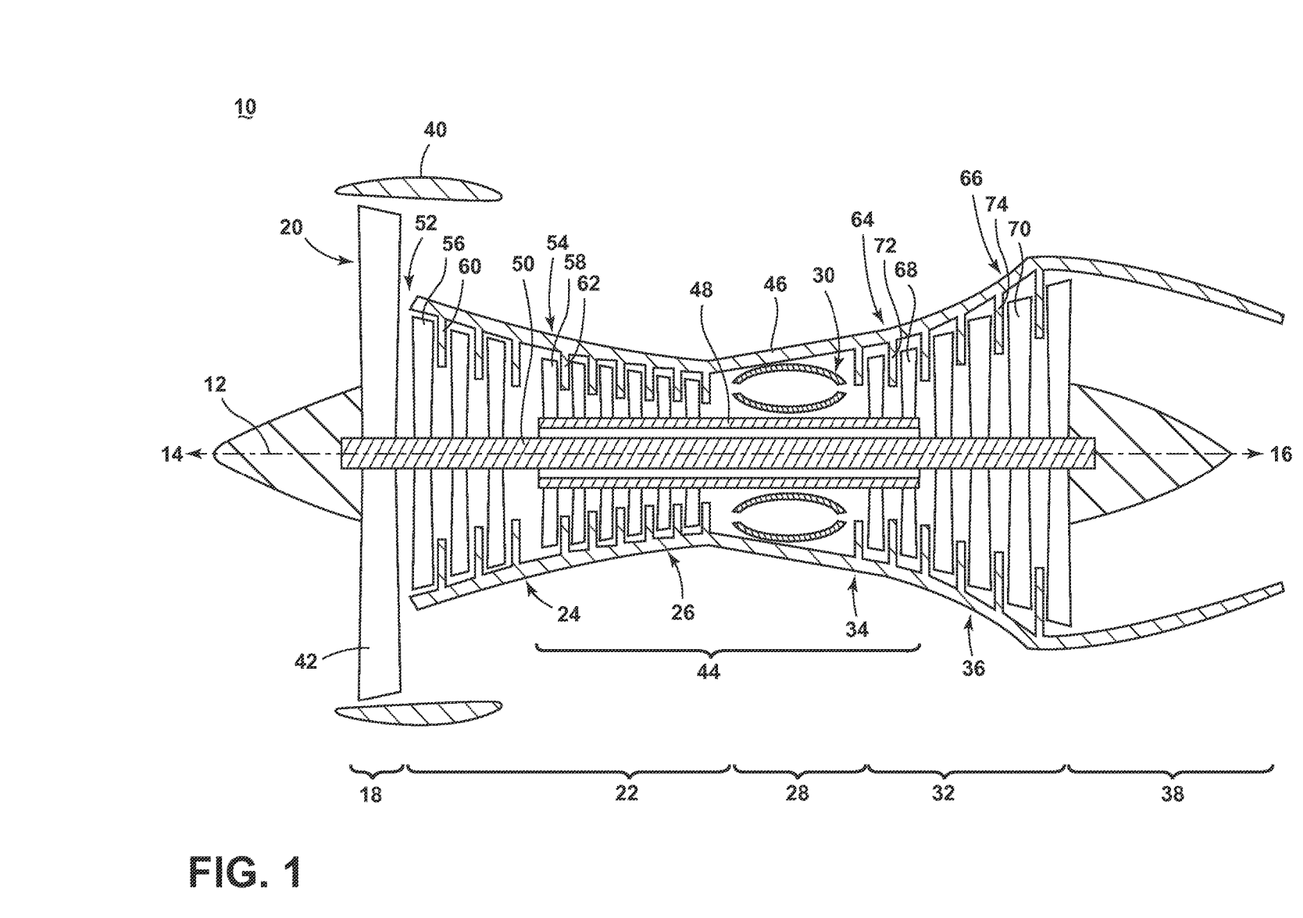
FIG. 1 illustrates a schematic cross-sectional diagram of a gas turbine engine for an aircraft comprising one or more engine components.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10 which generates combustion gases. The core 44 is surrounded by core casing 46 which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but is not limited to, fluid discharged from the LP compressor 24 or the HP compressor 26.

Figure 2:
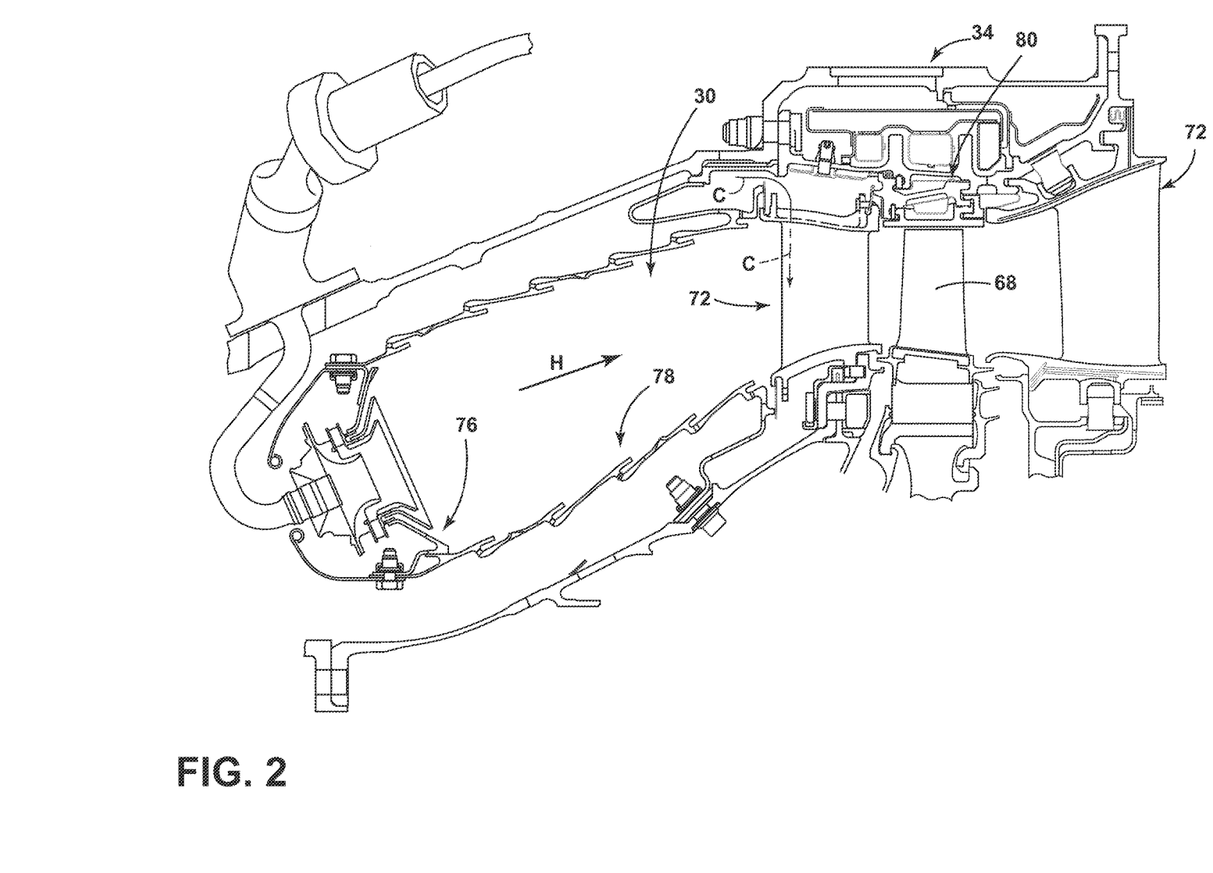
FIG. 2 illustrates a side section view of a combustor and a high-pressure turbine of the engine of FIG. 1, showing additional engine components.

FIG. 2 is a side section view of the combustor 30 and HP turbine 34 of the engine 10 from FIG. 1. The combustor 30 includes a deflector 76 and a combustor liner 78. Adjacent to the turbine blade 68 of the turbine 34 in the axial direction are sets of static turbine vanes 72 forming nozzles. The nozzles turn combustion gas so that the turbine 34 can extract the maximum amount energy. A cooling fluid flow C passes through the vanes 72 to cool the vanes 72 as hot combustion gas H passes along the exterior of the vanes 72. A shroud assembly 80 is adjacent to the rotating blade 68 to minimize flow loss in the turbine 34. Similar shroud assemblies can also be associated with the LP turbine 36, the LP compressor 24, or the HP compressor 26.

One or more of the engine components of the engine 10 has a film-cooled wall in which various film hole embodiments disclosed further herein can be utilized. Some non-limiting examples of the engine component having a film-cooled wall can include the blades 68, 70, vanes or nozzles 72, 74, combustor deflector 76, combustor liner 78, or shroud assembly 80, described in FIGS. 1-2. Other non-limiting examples where film cooling is used include turbine transition ducts and exhaust nozzles.

Figure 3:
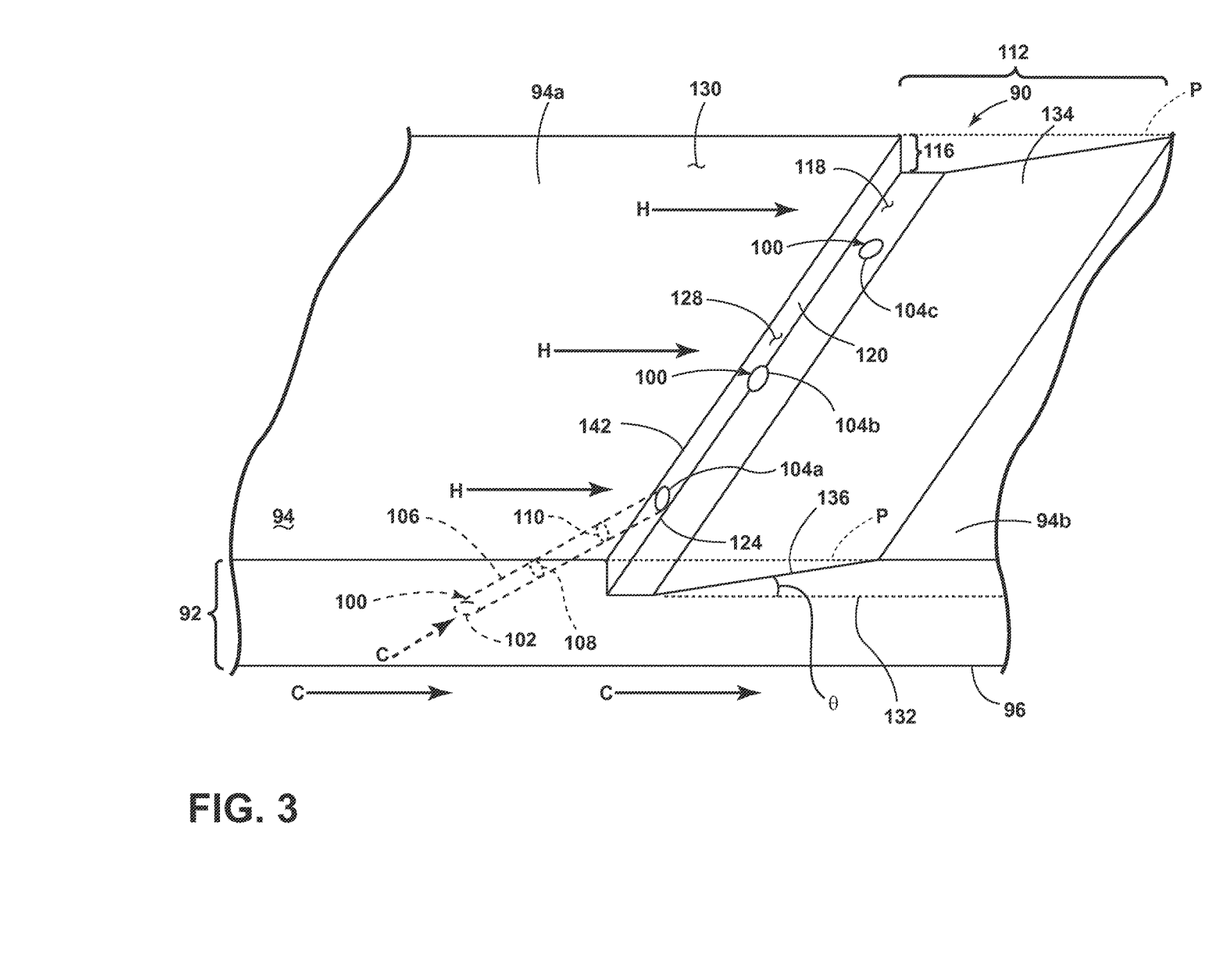
FIG. 3 illustrates a perspective view of a portion of the engine component having a contoured portion comprising a step with a plurality of film holes in accordance with a first embodiment.

FIG. 3 is a schematic view showing an engine component 90 of the engine 10 from FIG. 1 according to first embodiment. The engine component 90 can be disposed in a flow of hot gas represented by arrows H. A cooling fluid flow, represented by arrows C, can be supplied to cool the engine component 90. As discussed above with respect to FIGS. 1-2, in the context of a turbine engine, the cooling air can be ambient air supplied by the fan 20 which bypasses the engine core 44, fluid discharged from the LP compressor 24, or fluid discharged from the HP compressor 26.

The engine component 90 includes a wall 92 having a hot surface 94 comprising an upstream hot surface 94a and a downstream hot surface 94b facing the hot combustion gas H, and a cooling surface 96 facing the cooling flow C. The hot surface 94, comprising the upstream and downstream hot surfaces 94a, 94b further define a primary plane P. The primary plane P can be a general plane defined over the average surface of the hot surface 94, and is substantially parallel to the local hot combustion gas flow H. In the case of a gas turbine engine, the hot surface 94 can be exposed to gases having temperatures in the range of 1000° C. to 2000° C. or greater. Suitable materials for the wall 92 include, but are not limited to, steel, refractory metals such as titanium, or super alloys based on nickel, cobalt, or iron, and ceramic matrix composites. The cooling surface 96 can be an exterior surface or interior surface of the engine component 90. The engine component 90 further includes multiple film holes 100 that provide fluid communication between the cooling fluid flow C of the engine component 90 and the hot combustion gas H. During operation, the cooling fluid flow C is supplied through the film holes 100 to create a thin layer or film of cool fluid C on the hot surface 94, protecting it from the hot combustion gas H.

Each film hole 100 can have an inlet 102 provided on the cool surface 96 of the wall 92, an outlet 104, shown as outlets 104a-104c, provided on the hot surface 94. A passage 106 fluidly couples the inlets 102 and outlets 104. The cooling fluid flow C enters the film hole 100 through the inlet 102 and passes through the passage 106 before exiting the film hole 100 at the outlet 104 along the hot surface 94.

The engine component 90 provides for a shaping or contouring of the hot surface 94 of the engine component 90 by providing the hot surface 94 with a recess, shown as a contoured portion 112 that encompasses the outlets 104 of two or more film holes 100. Rather than shaping the outlet region to each individual film hole 100, which can introduce undesirable stress increases locally, two or more film holes 100 adjacent one another have their outlet regions, or outlets 104, encompassed within a broader surface contoured portion 112 to transition the flow more smoothly from the group of film holes 100. However, it is contemplated to shape the outlet region on a per-film hole basis.

The contoured portion 112 can encompass the outlets 104 of a partial row of film holes 100, or an entire row of film holes 100, whether that row be considered in a radial or axial direction, or otherwise oriented on the engine component 90. While only a portion of the engine component 90 is shown, it is understood that the engine component 90 can have multiple rows of film holes 100, with each row having a corresponding contoured portion 112 or a portion of the row only. Furthermore, while the contoured portion 112 is illustrated as a straight, longitudinal recess, a curved contoured portion 112, such as implementation on a curved airfoil or blade, is contemplated.

The recess comprising the contoured portion 112 is disposed in the hot surface 94 defining a longitudinal axis. The contoured portion 112 comprises a step 116 having a bottom wall 118 and a face 120 with the face 120 facing downstream. The contoured portion 112 can further divide the hot surface 94 into the upstream hot surface 94a and the downstream hot surface 94b, such that the upstream hot surface 94a is upstream of the contoured portion 112 and the downstream hot surface 94b is downstream of the contoured portion 112.

The face 120 can define a face local plane 128 and the hot surface 94 can define a hot surface local plane 130, the face local plane 128 being disposed substantially normal to the hot surface local plane 130. The face and hot surface local planes 128, 130 can further intersect, forming a line of intersection 142 normal to the direction of the hot air flow H. Additionally, the bottom wall 118 can define a bottom wall local plane 132, being substantially normal to the face local plane 128 and parallel to the hot surface local plane 130.

The outlets 104 of the film holes 100 can be formed in the face 120, the bottom wall 118, or a junction 124 of the face and the bottom wall 118. A first outlet 104a is disposed wholly in the face 120. A second outlet 104b, at the junction 124 of the face 120 and the bottom wall 118, is disposed partially in the face 120 and partially in the bottom wall 118 with the junction 124 between the face 120 and the bottom wall 118 defining a centerline through the second outlet 104b. Alternatively, the second outlet 104 can be disposed partially within the face 120 and the bottom wall 118, while being offset from the centerline defined by the junction 124. A third outlet 104c is disposed wholly in the bottom wall 118. It should be appreciated that multiple outlets 104 within one contoured portion 112 will typically be similarly disposed, however any combination of outlets 104a-104c is contemplated.

The step 116 has a right-angle, linear profile R, defined by the face 120 disposed normal to the bottom wall 118, in which the width of the bottom wall 118, being lateral to the longitudinal direction of the contoured portion 112 is approximately the same as the height of the face 120, while a face 120 of any height or a bottom wall 118 of any width is contemplated. Furthermore, the right-angle profile defined by the step 116 can comprise any angle, being greater than zero degrees but less than one-hundred-eighty degrees.

The contoured portion 112 further comprises a ramp 134. The ramp 134, defining a ramp local plane 136, extends from the bottom wall 118, terminating at the downstream hot surface 94b. The ramp 134 as shown is exemplary, and can operate as an inclined plane extending downstream from the bottom wall 118. An angle of incline Θ is defined between the ramp local plane 136 and the bottom wall plane 132. The ramp 134 can be disposed at an inclination such that the angle of incline Θ is twenty-five degrees or less, but can comprise any angle of incline Θ greater than zero degrees, but less than ninety degrees. Additionally, the bottom wall 118 can be removed such that the face 120 intersects the ramp 134 directly, defining an angular profile between the two, such as the right-angle profile R, comprising an acute angle rather than a right angle, or any other angle as determined by the disposition of the face 120 and the ramp 134.

The diameter of the outlets 104 are slightly smaller than the length of the face 120, however, the length of the face 120 can be as much as five times the diameter of the outlets 104, or more. The diameter of the film holes 100 can be forty mils or less, where one mil equals 0.001 inches, while film holes 100 of any size are contemplated. In one example, the diameter of the film hole 100 is twenty mils with the diameter of the outlets 104 also twenty mils, while the face 120 is slightly larger, such as twenty-four mils. The inlet 102, passage 106, and outlet 104 diameters can be greater or less than forty mils, as can be determined by the particular engine component 90, the size of the wall 92, the temperature of the system, or any other factor where more or less cool air is needed and can be supplied by a larger or smaller film holes 100. In further examples, the diameter of the film holes 100 can comprise differing diameters among the outlets 104, the inlets 102, and the passage 106.

The passage 106 can define a metering section 108 for metering of the mass flow rate of the cooling fluid C. The metering section can be a portion of the passage 106 with the smallest cross-sectional area, and can be a discrete location or an elongated section of the passage 106. As shown, the passage has a constant cross-sectional area such that the entire passage 106 operates as a metering section. The passage 106 can further define a diffusing section 110 in which the cooling fluid flow C can expand to form a wider cooling film. The diffusion section 110 has a larger cross-sectional area than the metering section 108. The metering section 108 can be provided at or near the inlet 102, while the diffusion section can be defined at or near the outlet 104.

Figure 4:
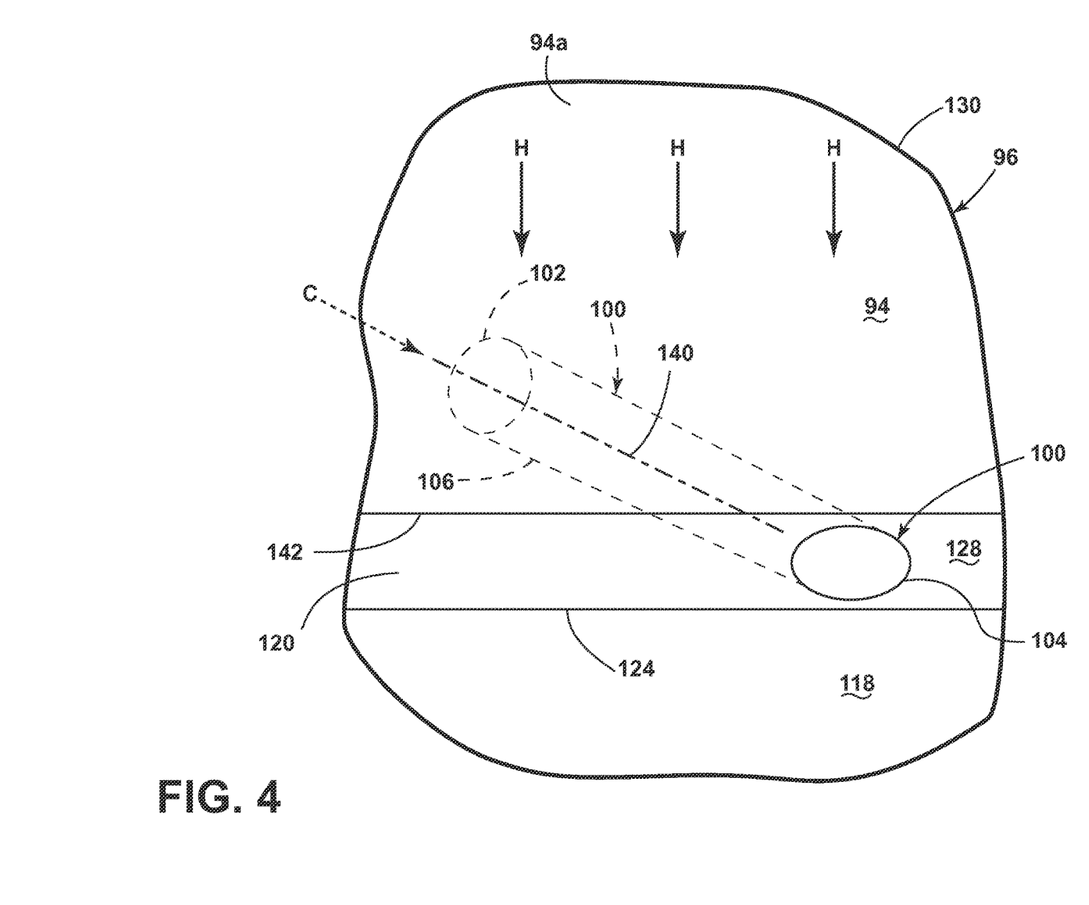
FIG. 4 illustrates a close-up top view of the passage of FIG. 3 defining a longitudinal axis.
Figure 5:
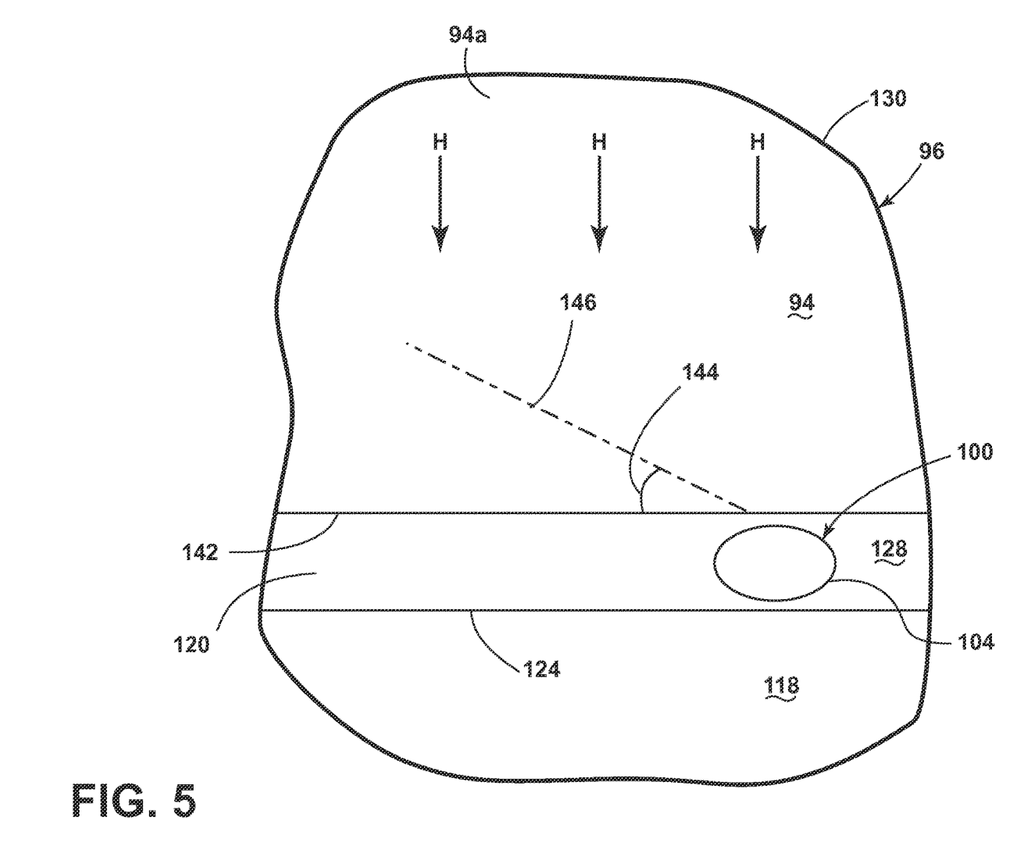
FIG. 5 illustrates a close up view of the longitudinal axis of FIG. 4 projected onto a hot surface local plane defining a first acute angle.

Turning now to FIG. 4, the inlet 102 provides the cooling fluid flow C to the outlet 104 through the passage 106. As such, the passage 106 defines a centerline, as a longitudinal axis 140, of which can be projected onto the hot surface local plane 130. In FIG. 5, a projected axis 146, being the projection of the longitudinal axis 140 onto the hot surface local plane 130, defines a first acute angle 144 between the projected axis 146 and the line of intersection 142. As can be appreciated, the first acute angle 144 can be used to direct the cooling fluid flow C into the contoured portion 112 at an angle in relation to the longitudinal axis 140 of the passage 106.

Figure 6:
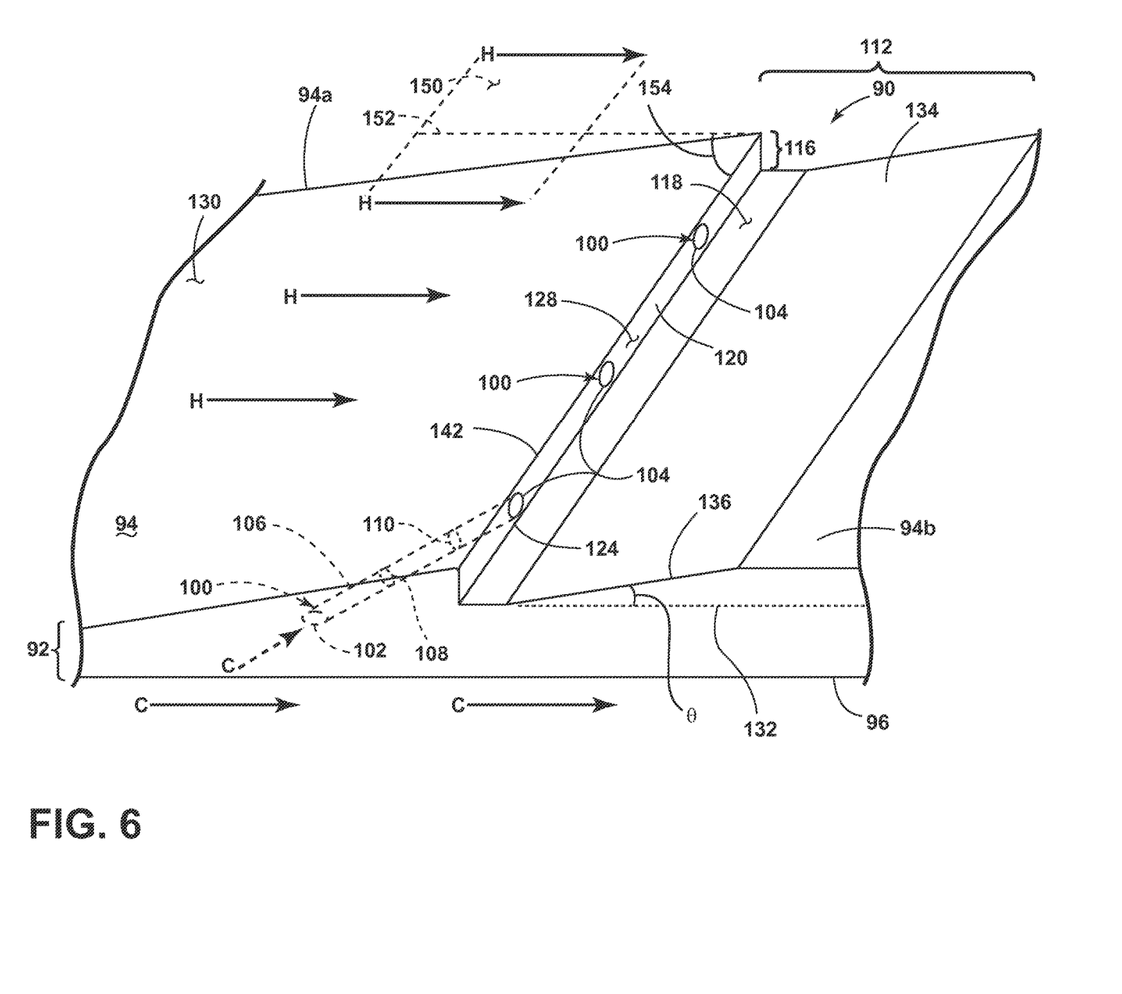
FIG. 6 illustrates a projection of a centerline onto a plane defined parallel to the hot air flow, defining a second acute angle relative to the hot surface local plane.

Turning now to FIG. 6, the upstream hot surface 94a can be disposed at an angle relative to the hot combustion gas H dependent on the shape of the engine component 90. The upstream hot surface 94a is disposed at an angle less than ninety-degrees, relative to the face 120, rather than at the right-angle profile. A projection of the centerline 152 onto a plane 150 parallel to the hot combustion gas H can form a second acute angle 152 relative to the hot surface local plane 130. Such an orientation of the hot surface 94 can operate to deflect the hot combustion gas H over the contoured portion 112, which can prevent premature mixing of the hot combustion gas H and cooling fluid flow C.

Figure 7:
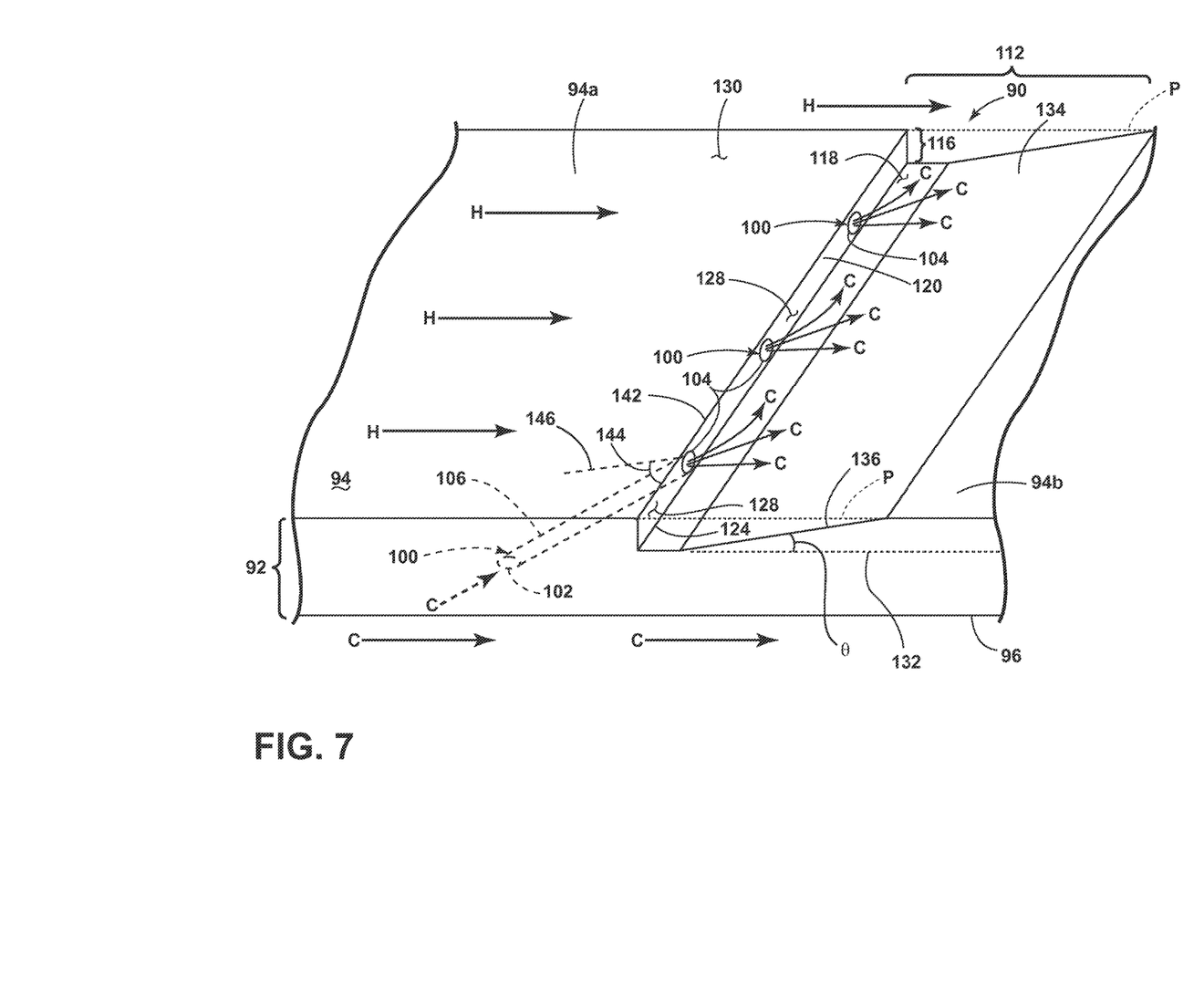
FIG. 7 illustrates the perspective view of the first embodiment of FIG. 3, showing a cool air flow exiting the film holes.

In FIG. 7, the direction and orientation of the cooling fluid flow C entering the contoured portion 112 can best be seen. The cooling fluid flow C enters the inlet 102 and moves through the passage 106 toward the hot combustion gas H. The cooling fluid flow C exits the passage 106 at the outlet 104, at an angle equivalent to the first acute angle 144, entering the recess defined by the contoured portion 112. The cooling fluid flow C spreads or diffuses within the contoured portion 112 such that the hot combustion gas H flows over the cooling fluid flow C.

The first acute angle 144 provides a vector for the flow of the cooling fluid flow C into the recess, such that the cooling fluid flow C can spread in a direction lateral to the flow of the hot combustion gas H, spreading evenly across the hot surface 94 rather than creating local areas of increased or decreased cool fluid film. Thus, the first acute angle 144 helps to increase residence time of the cooling fluid flow C within the recess. The cooling fluid flow C is allowed to spread and fill the region and form a layer of cooling fluid C on the ramp 134 and the downstream hot surface 94b. As such, fewer film holes 100 are required to effectively cover the hot surface 94 with the cooling fluid flow C.

Figure 8:
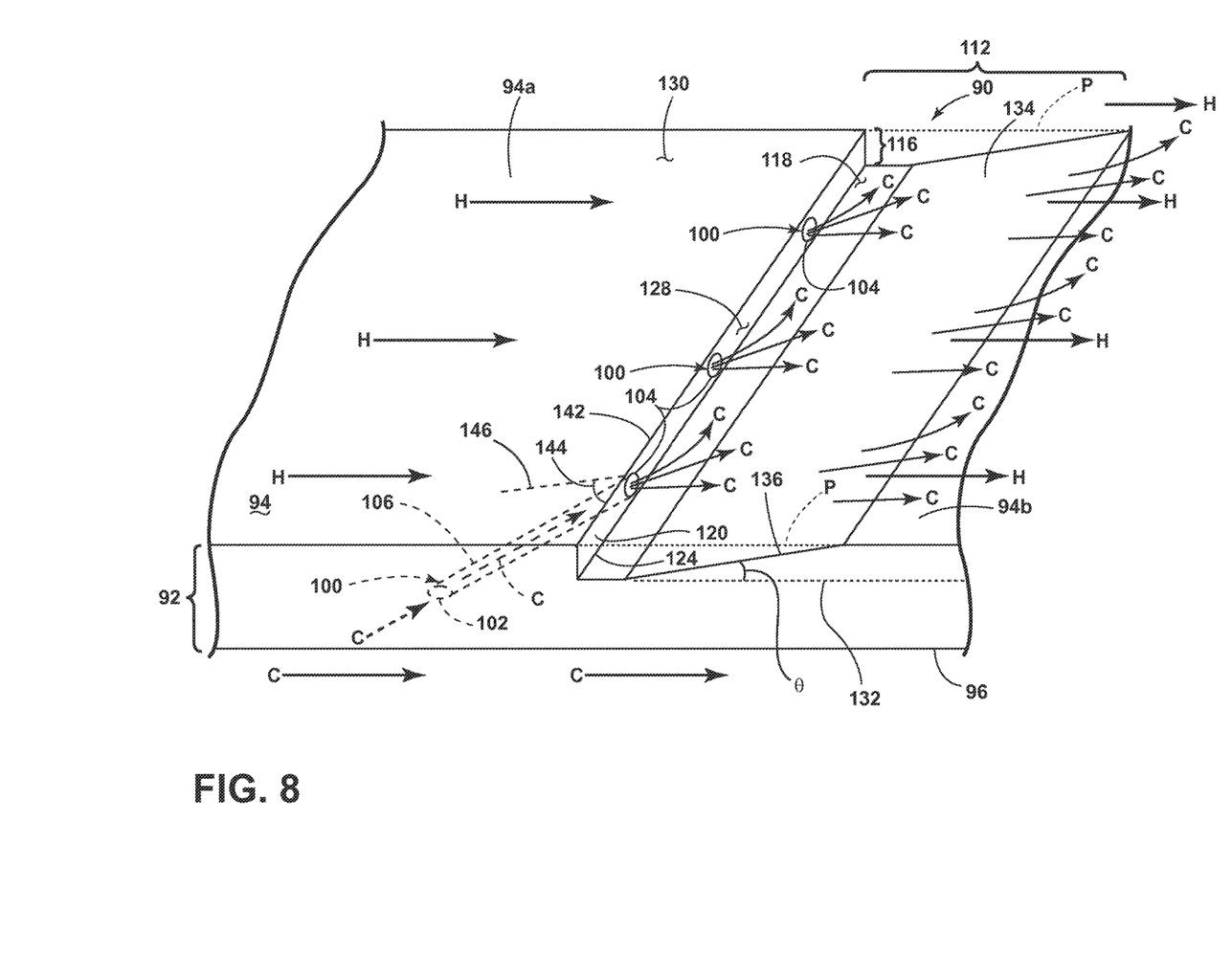
FIG. 8 illustrates the perspective view of FIG. 7, having the cool air flow moved up a ramp and over a downstream hot surface.

Turning to FIG. 8, the airflow path following FIG. 7 can be appreciated. As the cooling fluid flow C moves longitudinally along the contoured portion 112, the cooling fluid flow C is gradually pushed up the ramp 134 by the continued injection of additional cooling fluid C from the film holes 100, forming the layer on the ramp 134 and the downstream hot surface 94b to define the cooling film.

The cooling fluid flow C within the recess prevents premature mixing out of the cooling fluid flow C with the hot combustion gas H, increasing the effectiveness of the film cooling. The ramp 134 provides a gradual surface for allowing the cooling fluid C to disperse over the downstream hot surface 94b.

Figure 9:
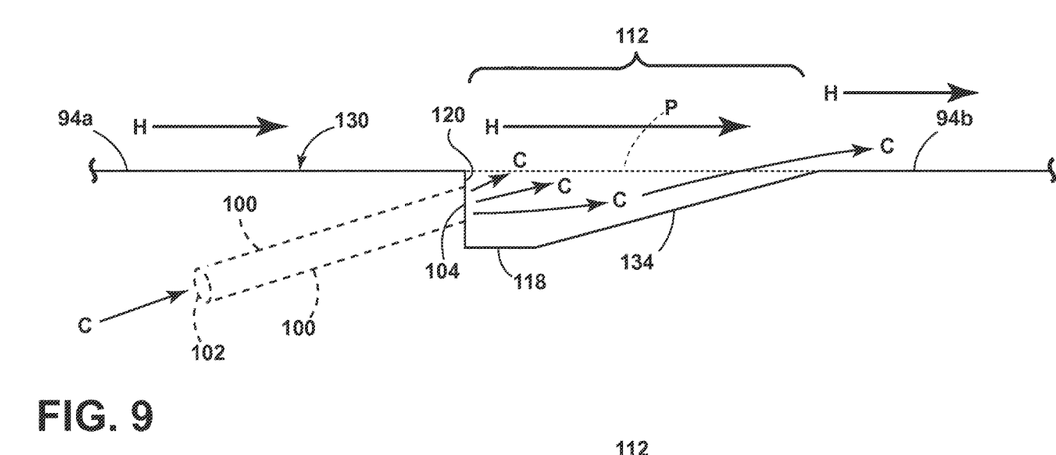
FIG. 9 illustrates a side profile view of the first embodiment of FIG. 3 with the cool air flow moving underneath the hot air flow.
Figure 10:
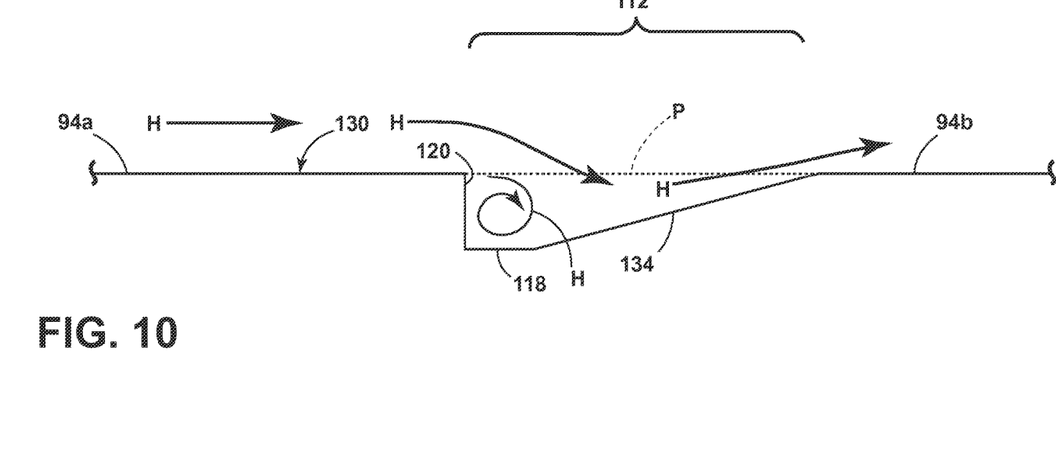
FIG. 10 illustrates a side profile view of a vortexed hot air flow within the contoured portion without the film hole of FIG. 9, in comparison to FIG. 9.

Turning to FIGS. 9 and 10, by comparison, the denial of the flow of the hot combustion gas H into the recess by utilizing the film hole 100 within the contoured portion 112, can be appreciated. In FIG. 9, the film hole 100 permits the cooling fluid flow C to enter the contoured portion 112. In FIG. 10, in contrast to FIG. 9, the film hole 100 is removed for exemplary purposes. As such, hot combustion gas H is allowed to flow into the contoured portion 112, developing a vortex-like orientation. In this orientation, the hot surface temperature within the recess can quickly rise above acceptable temperatures, providing the potential for engine component damage or failure. In FIG. 9, the film hole 100 orientation allows the cooling fluid flow C to spread across the contoured portion 112. Thus, the cooling fluid flow C diffuses throughout the contoured portion 112, preventing potential local areas of hot combustion gas H which can otherwise tend to develop within the contoured portion 112.

Figure 11:
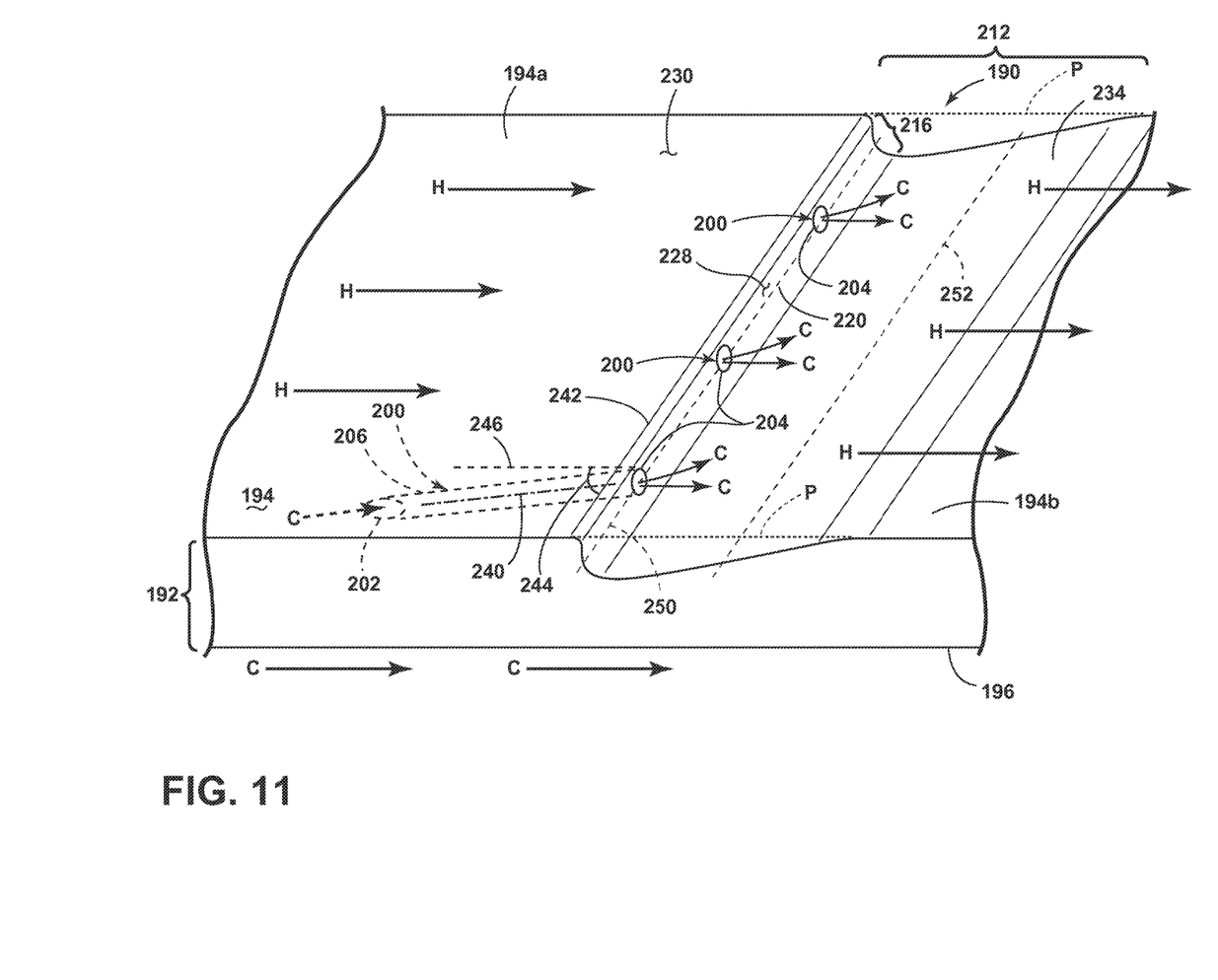
FIG. 11 illustrates a perspective view of an engine component having a contoured portion comprising a curvilinear step with a plurality of film holes in accordance with a second embodiment.

FIG. 11 shows a contoured portion 212 of an engine component 190 according to a second embodiment. The second embodiment can be substantially similar to the first embodiment and like elements are referred to with the same reference numerals with 100 added to the identifying numeral. In FIG. 11, the surfaces such as an upstream hot air surface 194a, a downstream hot air surface 194b, and the contoured portion 212, comprising a face 220 and a ramp 234, have curvilinear transitions, being smoothly radiused or filleted. The curvilinear transitions occur from the upstream hot surface 194a to the face 220, from the face 220 to the ramp 234, and from the ramp 234 to the downstream hot surface 194b, eliminating the bottom wall 118 of the first embodiment. The upstream hot surface 194a transitions to the face 220 in a curvilinear convex manner, inflecting to a concave curvilinear transition between the face 220 and the ramp 234 across a first axis of inflection 250. The radius defined on the curvilinear edge between the face 220 and the upstream hot surface 94a should be small, such as >5 mils. As illustrated, one or more outlets 204 are disposed along the face 220 such that the first axis of inflection 250, i.e. where the curvilinear profile has a local change of sign for the slope of the curve, such as at a local min or max, runs through the center of the outlets 204. In further embodiments, the position of the outlets 204 along the face 220 can be higher or lower, such that the first axis of inflection 250 is offset from the center of the outlets 204.

Furthermore, it is contemplated that the face 220 itself can be curvilinear, rather than defined by the transitions between the ramp 234 and upstream hot surface 194a. The face 220 can be contoured or wavy, being laterally or longitudinally contoured or wavy with respect to the contoured portion 212, having one or more inflections where the local sign for the slope of the curve changes at a local min or max multiple times along the surface of the face 220.

The curvilinear transition between the ramp 234 and the downstream hot surface 194b defines a convex surface with respect to the hot combustion gas H, and further defines a second axis of inflection 252, where the curvilinear profile has a local change of sign for the slope of the curve, such as at a local min or max, disposed at the lateral center of the ramp 234 with respect to the longitudinal direction of the contoured portion 212.

The shape and transitions among the hot surfaces 194a, 194b, the face 220, and the ramp 234, can be adapted such that the first and second axes of inflection 250, 252 can be positioned anywhere along the face 220 and the ramp 234, respectively.

The face 220, defining a face local plane 228, and the hot air surface 194, defining a hot surface local plane 230, further define a line of intersection 242 between them. A longitudinal axis 240, defined by the longitudinal direction of a passage 206 of the film hole 100 can be projected onto the hot surface local plane 130. The projection 246 of the longitudinal axis 240 defines a first acute angle 244 with the line of intersection 242.

The film hole 200 of the second embodiment, is shown in an exemplary manner, such that the first acute angle 244 is greater than that of the first acute angle 144 of the first embodiment (FIGS. 5-10). As such, the cooling fluid flow C moves in a manner closer to parallel to the hot combustion gas H, moving up the ramp 234 in a more directed manner. While the cooling fluid flow C does not spread as far longitudinally along the contoured portion 212 in the second embodiment as compared to the first embodiment, the cooling fluid flow C can move further downstream along the downstream hot surface 94b before mixing out, as compared to the first embodiment.

As can be appreciated, by comparison of the first acute angles 144, 244 of the first and second embodiment, the film hole 100, 200 can be oriented such that the passage 106, 206 defines the longitudinal axis 140, 240 to direct the cooling fluid flow C in a direction which can at least partially determine factors such as the amount of cooling fluid C within the contoured portion 112 and the rate at which the cooling fluid C moves downstream. It should be understood that the shape and dimensions of the contoured portion 112, 212 can also at least partially determine these factors.

It should be further appreciated that elements shown in the first and second embodiment are exemplary and some or all elements can be combined in implementing the contoured portion 112. It should be further appreciated that the first acute angle 144, 244 can be utilized to direct a cooling fluid flow C in an axial direction relative to the hot combustion gas H. The first acute angle 144, 244 can be changed as desired to spread a cooling fluid flow C further in a longitudinal direction relative to the contoured portion 112, 212, or in a manner substantially parallel to the hot airflow H; evenly spreading the cooling fluid flow C further in a longitudinal direction, or directing the cooling fluid flow C further in the direction of the hot combustion gas H, respectively, without premature mixing out. Thus, the first acute angle 144, 244 can be adapted relative to the needs of the local portion of the particular engine component 90, 190.

As can also be appreciated, the recess slows the mixing of the cooling fluid flow C with the hot combustion gas H, commonly referred to as mixing out, as well as decreases the chaotic or turbulent release of cooling fluid C over the hot surface 94, 194 of the engine component 90, 190. As such, the cooling fluid flow C exiting multiple film holes 100, 200 can be uniformly spread over the hot surface 94, 194 of the engine component 90, 190, evenly cooling the engine component 90, 190 without creating areas of increased or decreased cooling, which can unevenly heat or stress local areas of the engine component 90, 190.

The cooling fluid flow C entering the contoured portion 112, 212 can be evenly spread over the entire surfaces of the bottom wall 118 and the ramp 134, 234, allowing cooling fluid C to be evenly spread over ramp 134, 234 and to the downstream hot surface 94b, 194b and the engine component 90, 190. Furthermore, because the cooling fluid flow C prevents premature mixing out, efficiency and effectiveness of the film holes 100, 200 can be increased. As a result, fewer film holes 100, 200 are necessary to effectively cool the engine component 90, 190, decreasing costs and increasing structural integrity. Further still, utilizing the contoured portion 112, 212 with a greater or standard amount of film holes 100, 200, as compared to the industry standard, increases the effectiveness of the film cooling, allowing for an increased heat capacity for the engine component 90, 190 which can increase the efficiency of the system, reduce fuel costs, and extend the operating life of the engine component 90, 190.

In the above embodiments, the hot combustion gas H is shown as being in a direction generally across the cooling surface 96, 196 of the engine component 90, 190, with the film holes 100, 200 being arranged in a row extending generally transverse to the direction of the hot gas flow H. However, other row orientations with respect to the main direction of the hot combustion gas H are possible. For example, for some engine components 90, 190, the film holes 100, 200 can be arranged in a row having an orientation parallel to that of the hot gas flow H. Is it noted that the hot combustion gas H can be turbulent, and composed of directional components or vectors, particularly on a local scale with respect to the film holes 100, 200, but that the main or bulk flow direction can be transverse to, parallel to, or some combination thereof, the row of film holes 100, 200.

In any of the above embodiments, a protective coating, such as a thermal barrier coating, or multi-layer protective coating system can be applied to the hot surface 94 of the engine component 90, 190. It is also understood that the film holes 100, 200 and outlets 104, 204 can have various orientations, not just the axial orientations shown in the figures. Furthermore, the recess can be combined with shaping or contouring of the outlet 104, 204 and passage 106, 206 of the film holes 100, 200. The recess can also apply to slot-type film cooling, in which case the outlets 104, 204 are provided within a slot on the hot surface 94, 194.

The various embodiments of systems, methods, and other devices related to the subject matter disclosed herein provide improved cooling for engine components, particularly in an engine component having film holes. One advantage that can be realized in the practice of some embodiments of the described systems is that the hot surface of the engine component can be shaped to include a contoured portion encompassing the outlets of multiple film holes. Conventional film hole design utilizes a passage with a circular inlet region, a metering section, and a shaped outlet region to help diffuse the cooling fluid. However, shaping of the outlet region has been limited. By shaping the film hole to include a contoured outlet region, improved cooling performance in the engine component is achievable, which can lead to longer service life of the engine component, increased efficiency, a higher temperature capacity, and increased structural integrity without adding weight to the system.

Another advantage that can be realized in the practice of some embodiments of the described systems and methods is that multiple film holes can be encompassed within a regional contoured portion. Conventionally, surface contouring of film hole outlets requires local shaping around or into each individual film hole. By encompassing multiple outlets within a common contour, local design needs can be met, preconditioning the cooling fluid flow, re-directing the cooling fluid flow to provide a more beneficial dispersion from the film holes, or eliminating the typical exit flow separation, consequent of high turbulent and/or chaotic air currents.

This written description uses examples to disclose the invention, including the best mode, and to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An engine component for a gas turbine engine, the gas turbine engine generating a hot combustion gas flow, comprising:
    a wall separating the hot combustion gas flow from a cooling fluid flow and having a hot surface having a primary plane facing the hot combustion gas flow and a cooling surface facing the cooling fluid flow;
    a recess formed in the hot surface below the primary plane and at least partially defined by a step, a bottom wall extending from the step, and a ramp extending downstream from the bottom wall and upwardly toward the primary plane; and
    at least one film hole having an inlet provided on the cooling surface, an outlet provided on a junction where the step and the bottom wall meet, such that the outlet is at least partially contained on both the step and the bottom wall, and a passage connecting the inlet and the outlet.

2. The engine component of claim 1 wherein the ramp has a predetermined cross-sectional profile in the hot combustion gas flow direction.

3. The engine component of claim 2 wherein the cross-sectional profile is linear.

4. The engine component of claim 1 wherein the at least one film hole includes a second film hole wherein the outlet is provided on the bottom wall.

5. The engine component of claim 1 wherein the ramp extends from below the primary plane back up to at least the primary plane.

6. The engine component of claim 5 wherein the hot surface defines a hot surface local plane and the step defines a face local plane, which forms a line of intersection with the hot surface local plane, and a projection of a centerline of the film hole onto the hot surface local plane defines a first acute angle relative to the line of intersection.

7. The engine component of claim 6 wherein the first acute angle is less than 90 degrees.

8. The engine component of claim 6 wherein a second projection of the centerline onto a plane parallel to the hot combustion gas flow forms a second acute angle relative to the hot surface local plane.

9. The engine component of claim 8 wherein the second acute angle is less than 50 degrees.

10. The engine component of claim 8 further comprising a contoured portion forming the recess and the at least one film hole comprises multiple film holes, spaced along the step, and having corresponding first and second acute angles.

11. A method of cooling an engine component for a gas turbine engine, the gas turbine engine generating a hot combustion gas flow, comprising: a wall separating the hot combustion gas flow from a cooling fluid flow and having a hot surface having a primary plane facing the hot combustion gas flow and a cooling surface facing the cooling fluid flow; a recess formed in the hot surface below the primary plane and at least partially defined by a step, a bottom wall extending from the step, and a ramp extending downstream from the bottom wall and upwardly toward the primary plane; and at least one film hole having an inlet provided on the cooling surface, an outlet provided on a junction where the step and the bottom wall meet, such that the outlet is at least partially contained on both the step and the bottom wall, and a passage connection the inlet and the outlet; the method comprising:
    generating a flow of the cooling fluid into the recess.

12. The method of claim 11 wherein the generating the flow of the cooling fluid into the recess defines a longitudinal axis in an initial direction in which the cooling fluid flows into the recess such that the cooling fluid initially moves along the recess substantially transverse to the hot combustion gas flow.

13. The method of claim 12 wherein a projection of the longitudinal axis onto a local plane of the hot surface defines an acute angle.

14. The method of claim 13 wherein the generating the flow of the cooling fluid into the recess comprises generating cooling fluid flows into the recess.

* * * * *